United States Patent
Ningrat (10) Patent No.: US 8,654,098 B2
(45) Date of Patent: Feb. 18, 2014

(54) CAPACITIVE TOUCH SCREEN CONTROLLER IMPLEMENTING A SENSING METHOD FOR IMPROVED NOISE IMMUNITY

(75) Inventor: Kusuma Adi Ningrat, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 197 days.

(21) Appl. No.: 13/229,783

(22) Filed: Sep. 12, 2011

(65) Prior Publication Data

US 2013/0063388 A1  Mar. 14, 2013

(51) Int. Cl.
*G06F 3/045* (2006.01)

(52) U.S. Cl.
USPC .......................................................... 345/174

(58) Field of Classification Search
USPC ................................ 345/174, 173; 178/18.06
See application file for complete search history.

(56) References Cited

U.S. PATENT DOCUMENTS

| | | | |
|---|---|---|---|
| 7,982,723 B2 | 7/2011 | Ningrat | |
| 8,358,285 B2 * | 1/2013 | Leung et al. | 345/174 |
| 2009/0115740 A1 | 5/2009 | Ningrat et al. | |
| 2010/0051354 A1 | 3/2010 | Ningrat et al. | |
| 2010/0053097 A1 | 3/2010 | Goh et al. | |
| 2010/0066701 A1 | 3/2010 | Ningrat | |
| 2010/0097077 A1 * | 4/2010 | Philipp et al. | 324/678 |
| 2010/0328249 A1 | 12/2010 | Ningrat et al. | |
| 2012/0262410 A1 * | 10/2012 | Lim | 345/174 |

OTHER PUBLICATIONS

Manaresi, Nicolo, et al: "A CMOS-Only Micro Touch Pointer," IEEE Journal of Solid-State Circuits, vol. 34, No. 12, Dec. 1999, pp. 1860-1868.

Ningrat, Kusuma Adi: "Combination of Sensing Method to Improve Noise Immunity in Capacitive Touch Screen Controller," STMicroelectronics PowerPoint Presentation, Apr. 18, 2011 (15 pages).

* cited by examiner

*Primary Examiner* — Fred Tzeng
(74) *Attorney, Agent, or Firm* — Gardere Wynne Sewell LLP (57) ABSTRACT

A capacitive touch sensor includes horizontal lines vertical lines. Switching circuitry is coupled to the horizontal and vertical lines of the capacitive touch sensor. The switching circuitry is operable in a first mode to configure the horizontal lines as receive lines and the vertical lines as transmit lines for making a cross-capacitance measurement. In one implementation, the switching circuit is further operable in a second mode to configure the horizontal lines as transmit lines and the vertical lines as receive lines for making an additional cross-capacitance measurement. In another implementation, the switching circuit is further operable in a second mode to configure the vertical lines for making a self capacitance measurement. The various capacitance measurements from the first and second modes are algorithmically combined to obtain a total capacitance measurement having a reduced noise component.

30 Claims, 9 Drawing Sheets

CAPACITIVE TOUCH SCREEN CONTROLLER IMPLEMENTING A SENSING METHOD FOR IMPROVED NOISE IMMUNITY

BACKGROUND

1. Technical Field

The present invention relates to touch screens, and more particularly, to a touch screen that operates in a capacitive mode with improved noise immunity.

2. Description of Related Art

Figure 1:
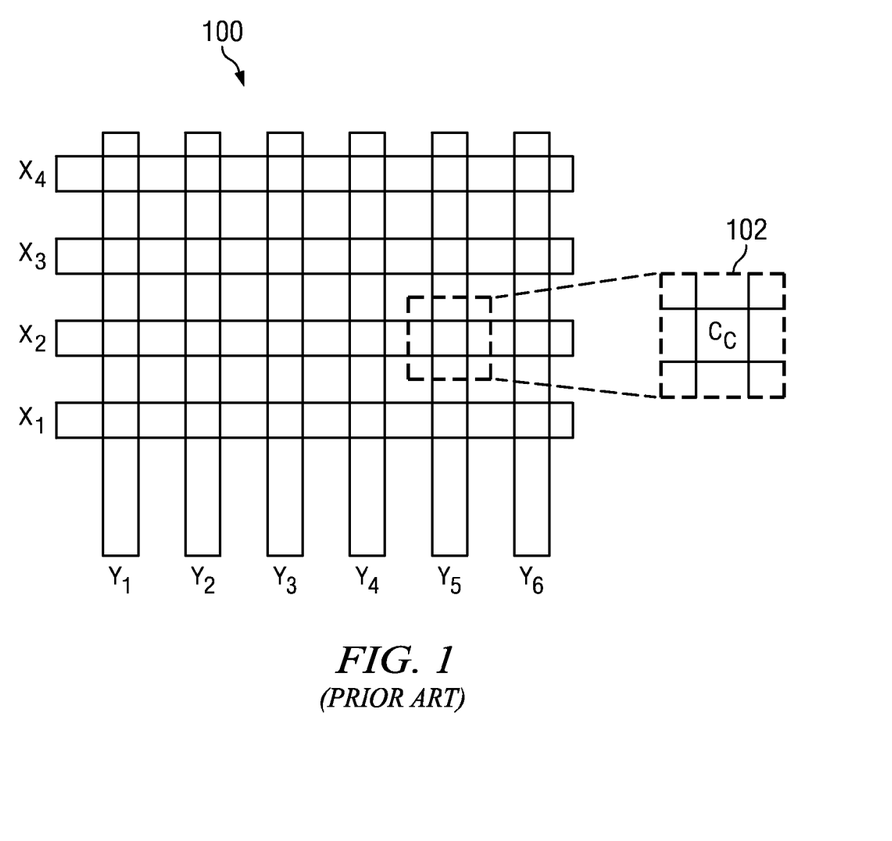
FIG. 1 is a schematic of a prior art capacitive touch screen sensor.

A schematic of a prior art capacitive touch screen sensor is shown in FIG. 1. A portion 100 of a capacitive touch screen is shown, having a plurality of open loop X-lines X1-X4 (extending parallel to each other in an x-axis direction), and a plurality of open loop Y-lines Y1-Y6 (extending parallel to each other in a y-axis direction). A portion 102 of the touch screen is further highlighted where, for example, the second X-axis line X2 crosses the fifth Y-axis line Y5. A cross-capacitance $C_C$ exists between these two lines (as well as at each intersection location 102 where one of the X-axis lines crosses one of the Y-axis lines). A capacitive touch screen sensor device measures the cross-capacitance at the intersection points between each of the X-axis lines and the Y-axis lines. When a finger presses at or near an intersection between two lines, the cross-capacitance at that intersection changes. A charge amplifier is used to quantify the charge transferred by the cross-capacitance, and the value can be digitized and further processed to make a touch detection as well as to locate that detected touch.

Figure 2:
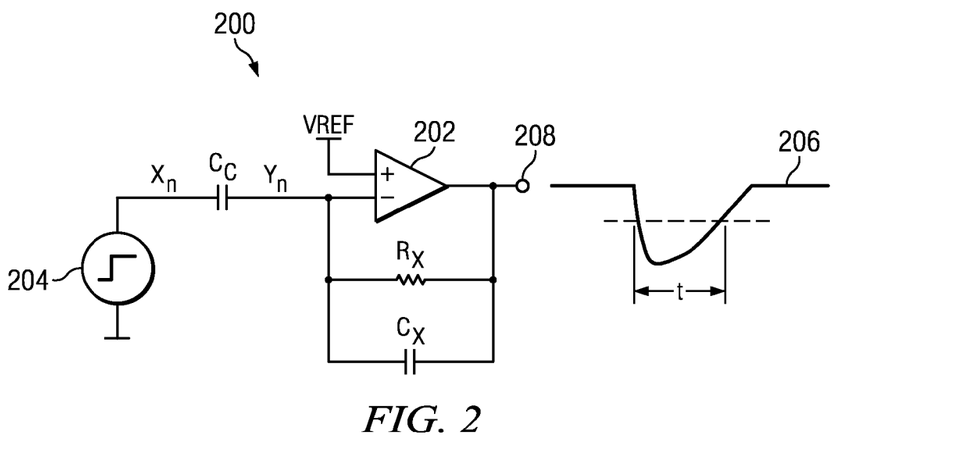
FIG. 2 is a schematic of a charge amplifier for use with a capacitive touch screen sensor of FIG. 1.

Referring now to FIG. 2, a charge amplifier 200 is shown for use in conjunction with a capacitive touch screen sensor like that shown in FIG. 1. Charge amplifier 200 includes a differential amplifier or operational amplifier 202 having a positive input for receiving a VREF reference voltage. An input signal 204 represents the signal input supplied by the user (for example, through a touching of the sensor at or near the location where the lines Xn and Yn cross), and capacitor $C_C$ represents the cross-capacitance at that location as shown in FIG. 1. A feedback impedance including resistor Rx and capacitor Cx is coupled between the output 208 and the negative input of amplifier 202. In operation, a rising edge input signal 204 is applied to a representative X-axis line Xn (referred to as the transmit line). The cross-capacitance ($C_C$) transfers charge to the corresponding Y-axis line Yn (referred to as the receive line). The charge amplifier 202 amplifies the charge and stores it across amplifier 202 while the capacitance Cx and Rx discharge the capacitor slowly. The width of a voltage glitch ("t") in the signal 206 at the output 208 of the amplifier 202 is proportional to the measured cross-capacitance with some degree of non-linearity.

Other circuit techniques for measuring cross-capacitance are well known to those skilled in the art.

Figure 3A:
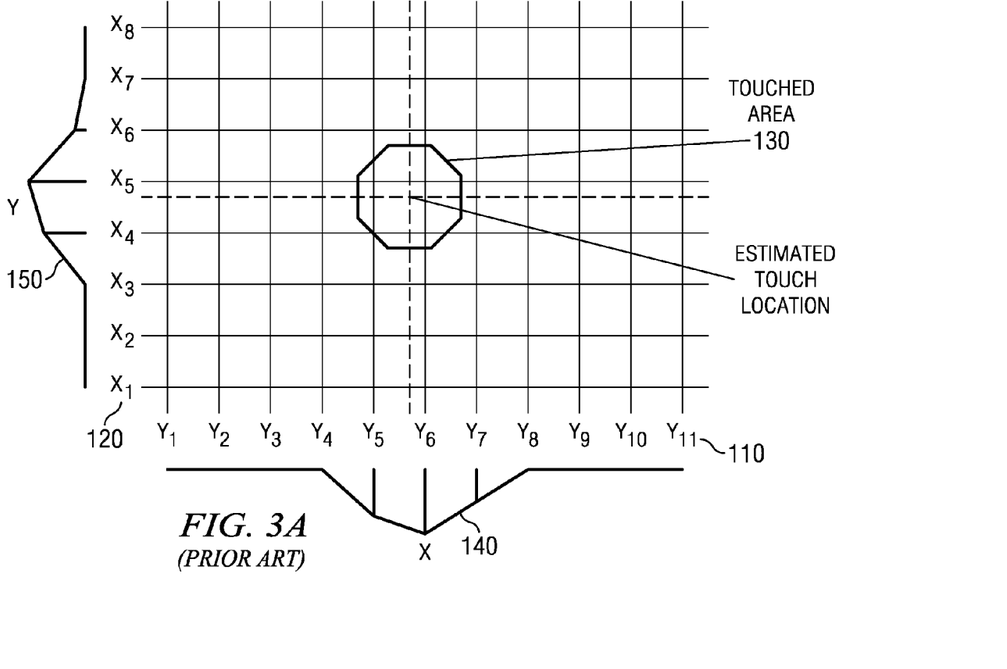
FIG. 3A is a schematic of a prior art capacitive touch screen sensor with capacitive histograms illustrating detection of a touch.

With reference to FIG. 3A, a prior art capacitive touch screen sensor includes Y-axis lines Y1-Y11 (reference 110; lines extending parallel to each other in the y-axis direction) and X-axis lines X1-X8 (reference 120; lines extending parallel to each other in the x-axis direction). An example touch 130 is illustrated. As described above, the capacitance of the sensor array (specifically at the intersection points at or near the touch) changes as a result of the presence of the human finger at the touch 130. The charge amplifier 20 of FIG. 2 can be used as a measurement circuit with respect to each location where the lines Xn and Yn cross to measure the cross-capacitance ($C_C$). The change in measured cross-capacitance as a result of the presence of the human finger at the touch 130 is indicated by the capacitance histograms 140 and 150 (with histogram 140 indicating the measured change in cross-capacitance along the X axis and the histogram 150 indicating the measured change in cross-capacitance along the Y axis). The values of the measured capacitance can be processed so as to identify an estimate of the touched location.

Figure 3B:
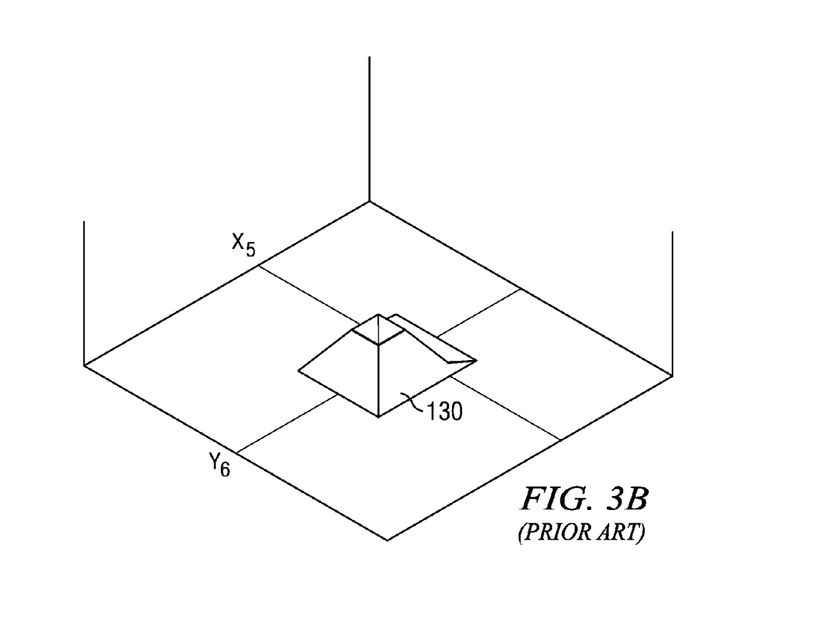
FIG. 3B is a three dimensional representation of the capacitive histograms in FIG. 3A.

FIG. 3B illustrates the combination of the capacitance histograms 140 and 150 of FIG. 3A illustrated in three dimensions as a three dimensional cross-capacitance histogram representative of the touch 130.

Figure 4A:
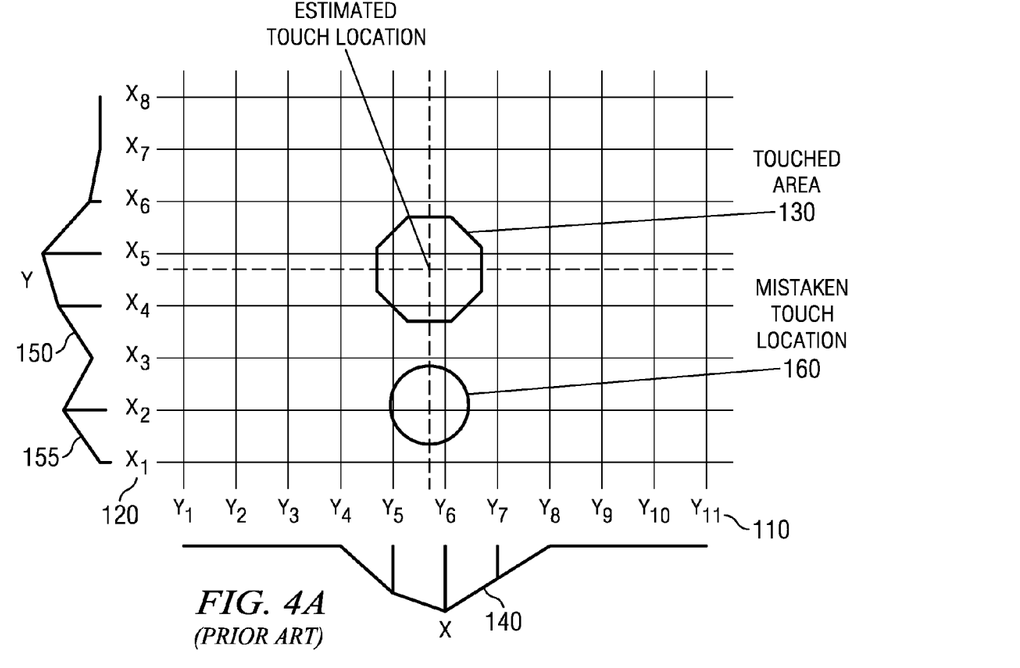
FIG. 4A is a schematic of a prior art capacitive touch screen sensor with capacitive histograms illustrating detection of a touch and noise.

FIG. 4A is similar to FIG. 3A except that noise has been introduced. As is known to those skilled in the art, the noise in a capacitive touch screen sensor potentially affects the whole receive line. So, where the X-axis lines Xn are the transmit lines and the Y-axis lines Yn are the receive lines, the noise would be detected along the Y-axis lines and show up in the histogram 150 indicating the measured capacitance along the Y axis. This is indicated in FIG. 4 at reference 155 by an additional peak in the histogram 150. If the measured capacitance associated with the additional peak at reference 155 exceeds a detection threshold, then this noise might mistakenly present an additional touch 160 detection which would be a "false" touch detection made in addition to the correct touch detection associated with touch 130.

Figure 4B:
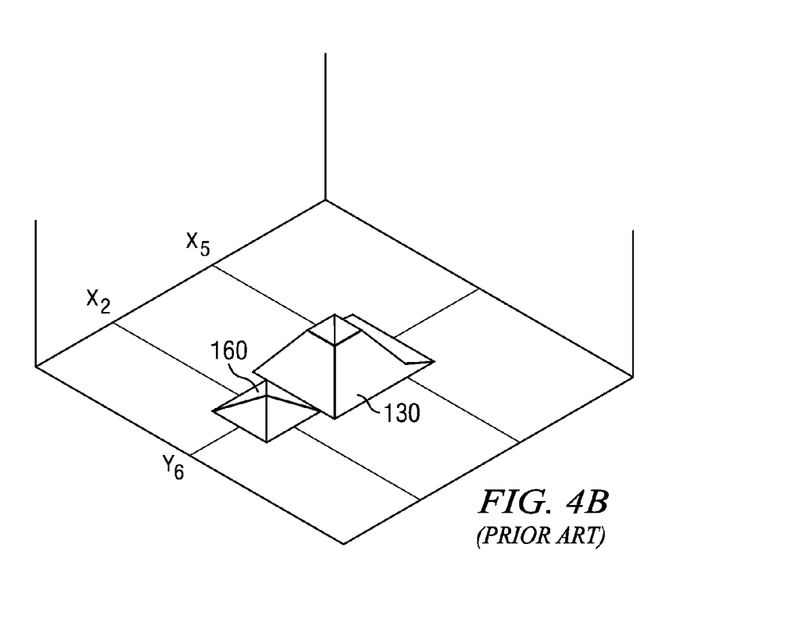
FIG. 4B is a three dimensional representation of the capacitive histograms in FIG. 4A.

FIG. 4B illustrates the combination of the capacitance histograms 140 and 150 of FIG. 4A illustrated in three dimensions as a three dimensional cross-capacitance histogram representative of the touch 130 and the false touch 160 due to the presence of noise on the receive lines.

Figure 5:
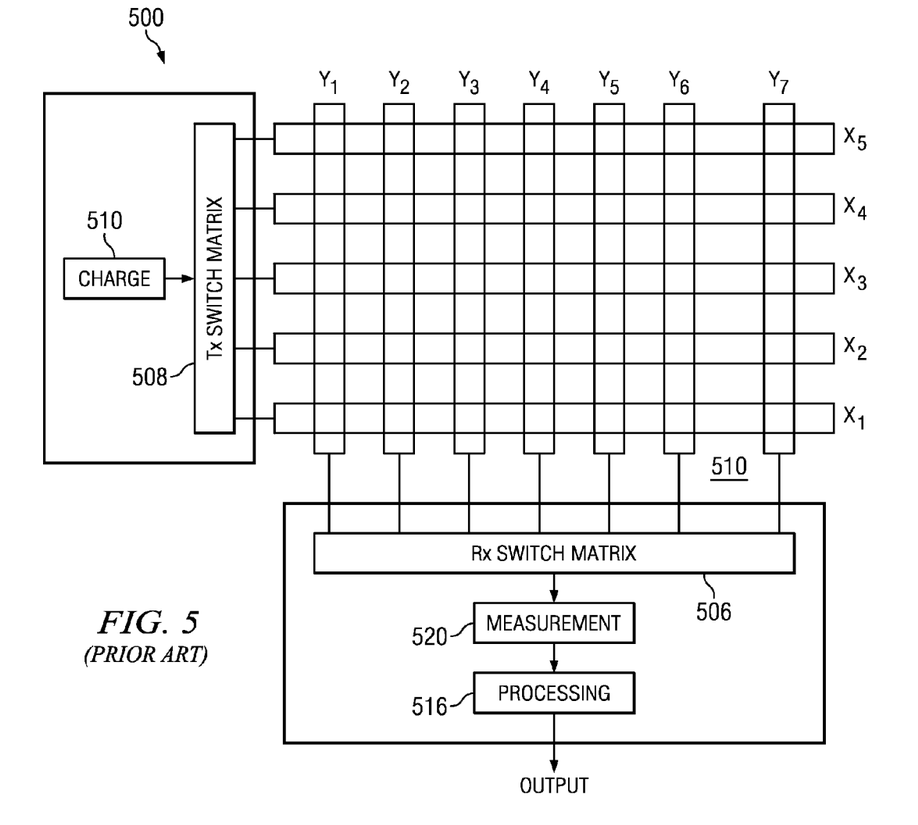
FIG. 5 is a block diagram of a prior art capacitive touch screen system.

Referring now to FIG. 5, a capacitive touch screen system 500 is shown. The touch screen system 500 includes a touch screen sensor 510, which comprises a plurality of X-axis lines Xn (extending parallel to each other in the x-axis direction) and a plurality Y-axis lines Yn (extending parallel to each in the y-axis direction). The touch screen system 500 also includes a first switch matrix 506, comprising a receive (RX) switch matrix, having a plurality of inputs respectively coupled to an end of each of the Y-axis lines Yn. The output of the first switch matrix 506 is coupled to the input of a capacitive measurement circuit 520, such as the circuit shown in FIG. 2, and the output of the capacitive measurement circuit 520 is coupled to the input of a processing circuit 516. The touch screen system 500 further includes a second switch matrix 508, comprising a transmit (TX) switch matrix, having a plurality of outputs respectively coupled to an end of each of the X-axis lines Xn. An input to the second switch matrix 508 is coupled to the output of a charge circuit 510.

To measure the cross-capacitance in a capacitive operating mode of the touch screen system 500, the first switch matrix 506 and second switch matrix 508 are configured to make selections of the X-axis lines and the Y-axis lines. The charge circuit 510 applies a charge to one X-axis line (operating as a transmit line) selected by the second switch matrix 508. Charge is transferred from that X-axis line to each of the Y-axis lines Yn (operating as receive lines), that transferred charge being modified by the presence/absence of a touch being made to the sensor. The measurement circuit 520 is then sequentially connected by the first switch matrix 506 to each of the Y-axis lines Yn and a measurement of capacitance is made for each line at the point of intersection between the selected X-axis line and each of the Y-axis lines. The second switch matrix 508 then selects another X-axis line and the process of measuring capacitance for each of the Y-axis lines Yn is performed again. This repeats until the second switch matrix 508 has selected each of the X-axis lines Xn, and a measurement of capacitance has been made as to each point of intersection between an X-axis line and a Y-axis line. The result of the foregoing process is, for example, a data matrix populated by the measured capacitances at each intersection point. The processing circuit 516 may then process the measured capacitances in the data matrix by applying an appropriate threshold value so as to identify instances of a touch. As discussed above, however, noise can adversely affect the capacitive measurements made along an entire receive line (in this case, an entire y-axis line Yn) even if the noise is injected in certain nodes. The noise along the receive line may be detected as a capacitance change by the measurement circuit 520 and evaluated by the processing circuit 516 as a false touch where the measured capacitance at intersection points along the receive line exceeds the touch threshold.

There is a need in the art to address the foregoing problem and provide for improved noise immunity with respect to the operation of capacitive touch screen sensors.

SUMMARY

In an embodiment, a circuit comprises: a capacitive touch sensor including a plurality of first lines and a plurality of second lines, said first and second lines being oriented to cross each other; and switching circuitry coupled to the plurality of first lines and the plurality of second lines of the capacitive touch sensor, said switching circuitry operable in a first mode to configure the plurality of first lines as receive lines and the plurality of second lines as transmit lines for cross-capacitance measurement, and said switching circuitry further operable in a second mode to configure the plurality of first lines as transmit lines and the plurality of second lines as receive lines for cross-capacitance measurement.

In another embodiment, a circuit comprises: a capacitive touch sensor including a plurality of first lines and a plurality of second lines, said first and second lines being oriented to cross each other; and switching circuitry coupled to the plurality of first lines and the plurality of second lines of the capacitive touch sensor, said switching circuitry operable in a first mode to configure the plurality of first lines as receive lines and the plurality of second lines as transmit lines for cross-capacitance measurement, and said switching circuitry further operable in a second mode to configure the plurality of second lines for self capacitance measurement.

In another embodiment, a method comprises: configuring a capacitive touch sensor including a plurality of first lines and a plurality of second lines, said first and second lines being oriented to cross each other, in a first mode wherein the plurality of first lines are configured as receive lines and the plurality of second lines are configured as transmit lines for cross-capacitance measurement; and configuring said capacitive touch sensor in a second mode wherein the plurality of first lines are configured as transmit lines and the plurality of second lines are configured as receive lines for cross-capacitance measurement.

In another embodiment, a method comprises: configuring a capacitive touch sensor including a plurality of first lines and a plurality of second lines, said first and second lines being oriented to cross each other, in a first mode wherein the plurality of first lines are configured as receive lines and the plurality of second lines are configured as transmit lines for cross-capacitance measurement; and configuring said capacitive touch sensor in a second mode wherein the plurality of second lines are configured for self capacitance measurement.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 6A:
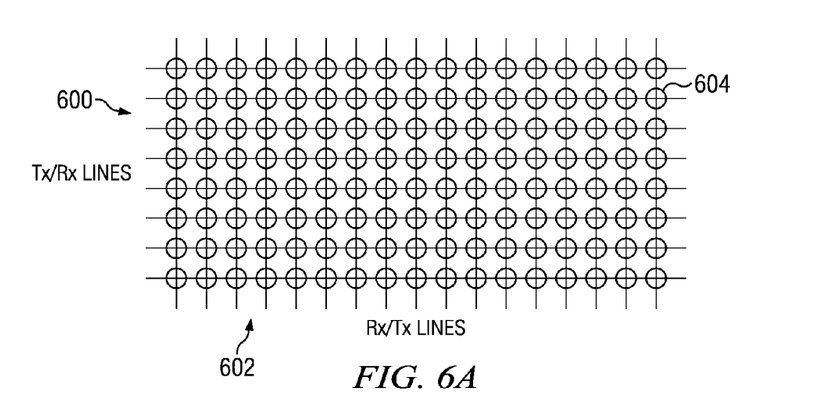
FIG. 6A is a schematic of a capacitive touch screen sensor in which the X-axis lines and the Y-axis lines are selectively configurable as transmit or receive lines.

Reference is now made to FIG. 6A which is a schematic of a capacitive touch screen sensor in which the X-axis lines and the Y-axis lines are selectively configurable as transmit or receive lines. Thus, the sensor includes a plurality of X-axis lines Xn 600 (i.e., lines extending parallel to each other in the x-axis direction) and a plurality of Y-axis lines Yn 602 (i.e., lines extending parallel to each other in the y-axis direction). Thus, the lines 600 and 602 are orthogonally oriented, but it will be understood that the sensor could instead be configured with first and second lines that intersect each other. At each location 604 where the X-axis and Y-axis lines intersect, a cross-capacitance is defined. This cross-capacitance is measured by applying a charge to the transmit line and detecting the transfer of charge to the receive line. The transfer of charge is affected by a touch made to the sensor at or near the intersection location 604. By measuring transfer of charge at each location 604, and further processing that information for all intersection locations of the sensor, a detection of the touch as well as the location of the touch can be made. This process is well known to those skilled in the art, and has been generally described above.

Figure 6B:
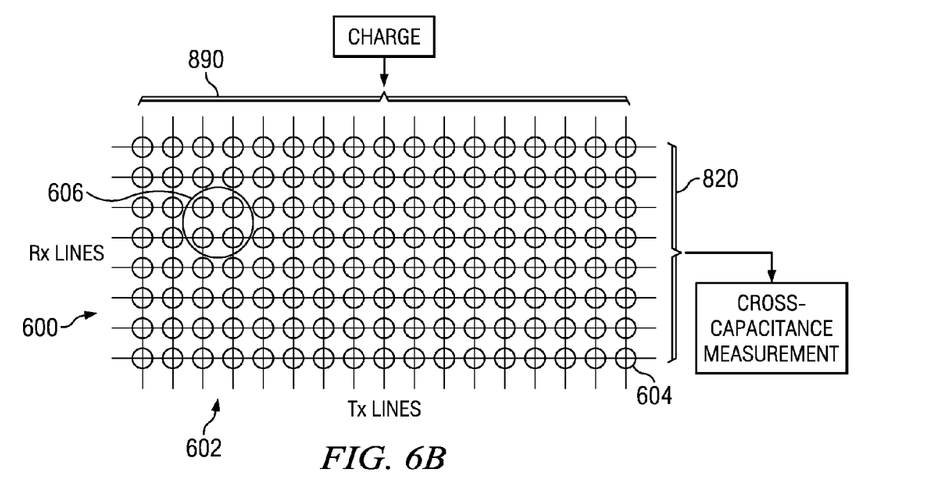
FIG. 6B illustrates the sensor of FIG. 6A with the X-axis lines configured as receive lines and the Y-axis lines configured as transmit lines.
Figure 6C:
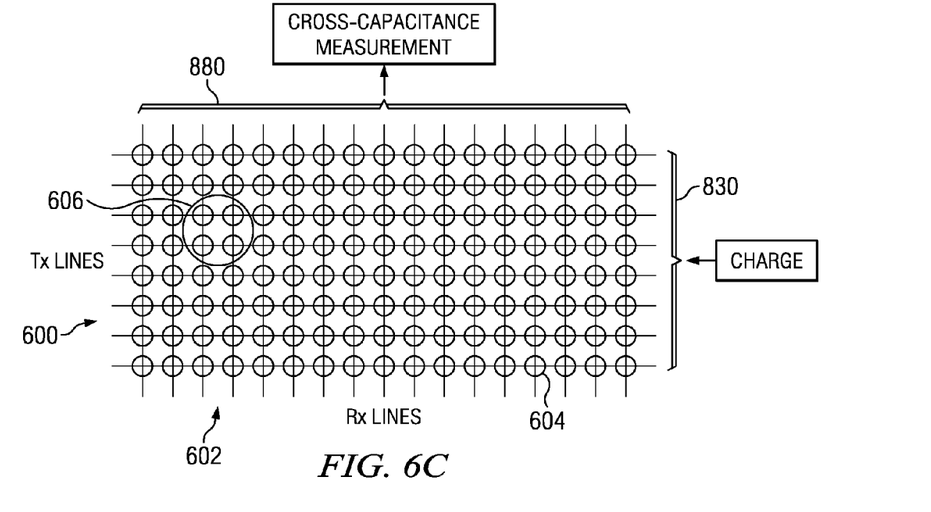
FIG. 6C illustrates the sensor of FIG. 6A with the X-axis lines configured as transmit lines and the Y-axis lines configured as receive lines.

The sensor of FIG. 6A differs from known prior art solutions in that the X-axis lines and the Y-axis lines are selectively configurable as transmit or receive lines (this being indicated by the designations "Tx/Rx" and "Rx/Tx" with respect to the X-axis lines and the Y-axis lines). FIG. 6B illustrates the sensor of FIG. 6A with the X-axis lines configured as receive lines and the Y-axis lines configured as transmit lines, and further schematically illustrates the circuitry associated with operation in this configuration mode (to be described in more detail below). FIG. 6C illustrates the sensor of FIG. 6A with the X-axis lines configured as transmit lines and the Y-axis lines configured as receive lines, and further schematically illustrates the circuitry associated with operation in this configuration mode (to be described in more detail below). Appropriate control and switching circuitry, an example of which is described in more detail herein, is used to change the mode of operation of the sensor of FIG. 6A between the configuration mode shown in FIG. 6B and the configuration mode shown in FIG. 6C for the purpose of selectively connecting the charging circuitry and the detection/cross-capacitance measurement circuitry to the desired X-axis lines and the Y-axis lines.

Figure 7A:
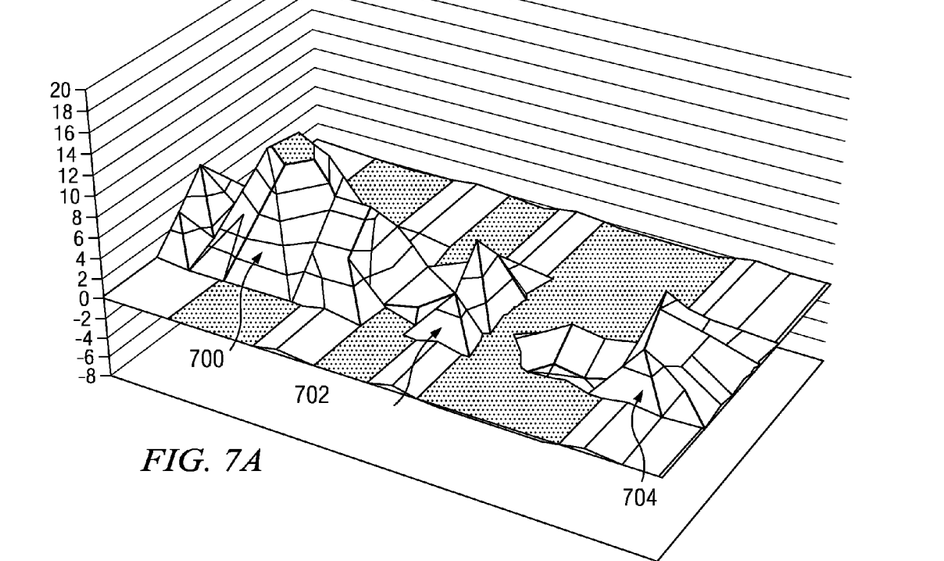
FIG. 7A is an illustrative three dimensional capacitive histogram produced by the sensor of FIG. 6A when configured in the FIG. 6B mode.

FIG. 6B further shows that a touch 606 of the sensor has been made. FIG. 7A is an exemplary three dimensional capacitive histogram produced by the sensor of FIG. 6A with the X-axis lines configured as receive lines and the Y-axis lines configured as transmit lines in the manner illustrated by FIG. 6B with a charge being selectively applied by switching matrix 890 to the transmit lines and a cross-capacitance measurement circuit being selectively coupled by switching matrix 820 to the receive lines. It will be noted that the histogram exhibits several peaks in the x-axis direction. A main peak 700 is associated with the touch 606 in FIG. 6B. However, there are additional peaks 702 and 704 along the direction of the receive lines which could be mistakenly identified by the sensor processing as touches.

Figure 7B:
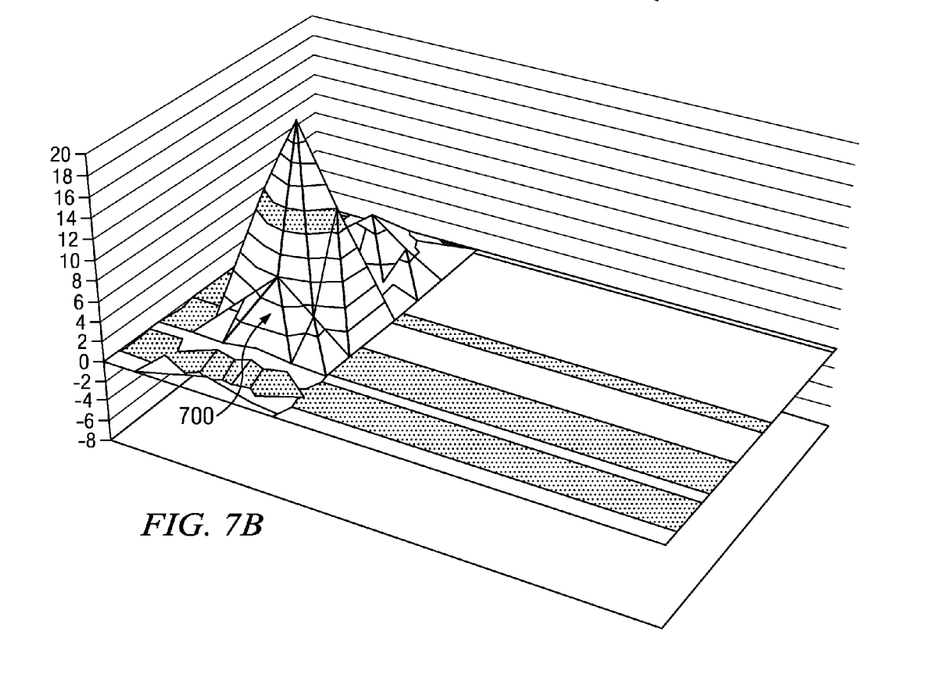
FIG. 7B is an illustrative three dimensional capacitive histogram produced by the sensor of FIG. 6A when configured in the FIG. 6C mode.

The same touch 606 is present (i.e., remains) in FIG. 6C. FIG. 7B is an exemplary three dimensional capacitive histogram produced by the sensor of FIG. 6A with the X-axis lines configured as transmit lines and the Y-axis lines configured as receive lines in the manner illustrated by FIG. 6C with a charge being selectively applied by switching matrix 830 to the transmit lines and a cross-capacitance measurement circuit being selectively coupled by switching matrix 880 to the receive lines. A main peak 700 associated with the touch 606 in FIG. 6C is present, however there are no additional peaks in the x-axis direction (compare to FIG. 7A). Thus, it will be noted that there is a different view of the touch when the transmit and receive lines are swapped by the mode change and the cross-capacitance measurements are made at each intersection location. Although not specifically illustrated in FIG. 7B, it will be understood that the three dimensional capacitive histogram in FIG. 7B may include additional peaks in the y-axis direction along the receive lines due to noise (analogous to the additional peaks in the x-axis direction present in FIG. 7A) and that these additional peaks, when present, could be mistakenly identified by the sensor processing as touches.

Figure 7C:
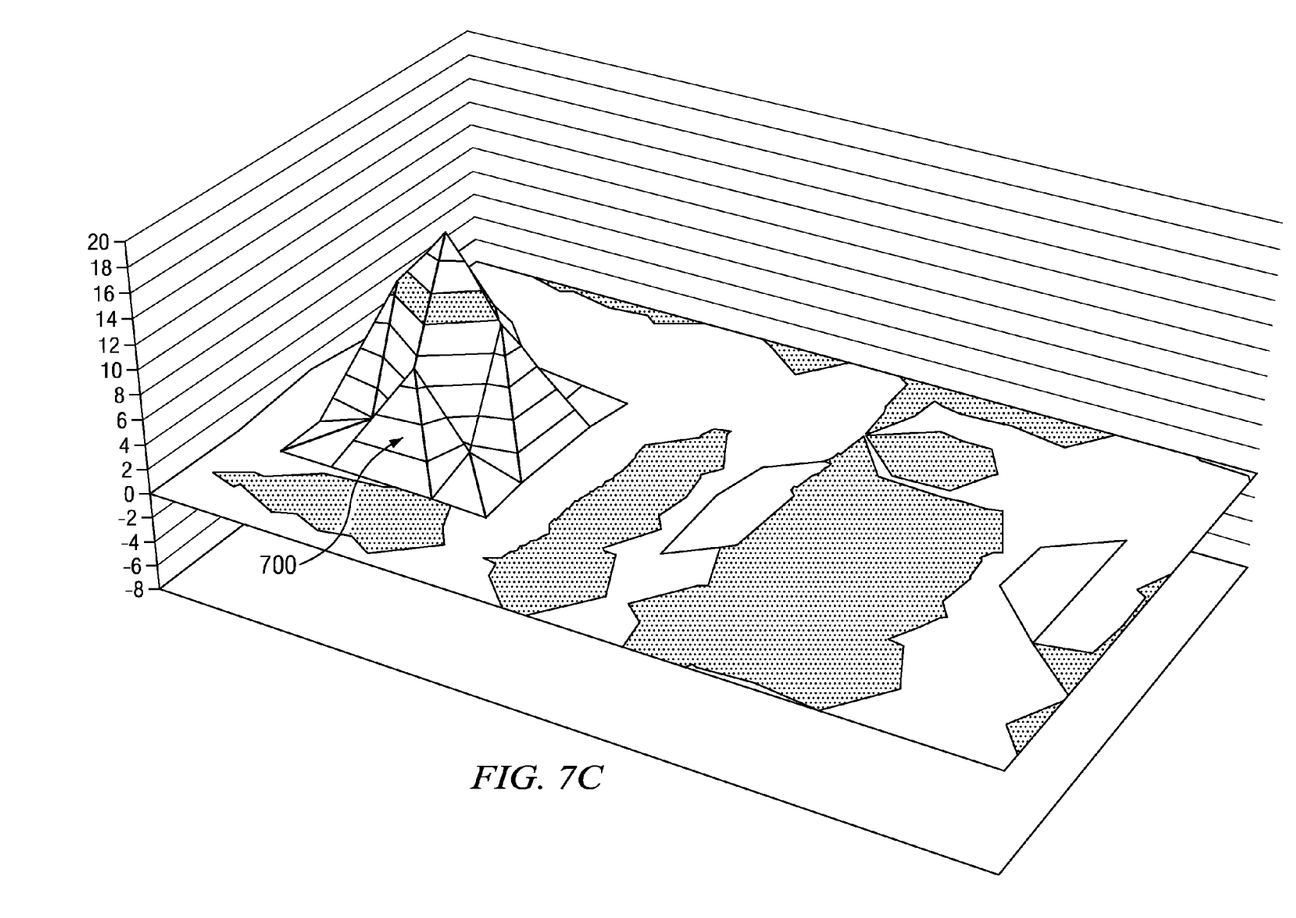
FIG. 7C is an illustrative three dimensional capacitive histogram produced by combining the capacitive information from both the FIG. 6B mode and the FIG. 6C mode.

By combining the sensed capacitance information obtained from both modes of operation, FIG. 6B and FIG. 6C, it is possible to eliminate, reduce or minimize the additional peaks present in the three dimensional capacitive histogram due to noise on the receive lines and thus detect only the actual touch. FIG. 7C is an illustrative three dimensional capacitive histogram produced by combining the capacitive information from both the FIG. 6B mode and the FIG. 6C mode. A main peak 700 associated with the touch 606 in FIGS. 6B and 6C is present, however there are no additional peaks in either the x-axis direction or the y-axis direction, and thus the chance of making a false touch detection is reduced because the noise has been reduced or eliminated.

Figure 8:
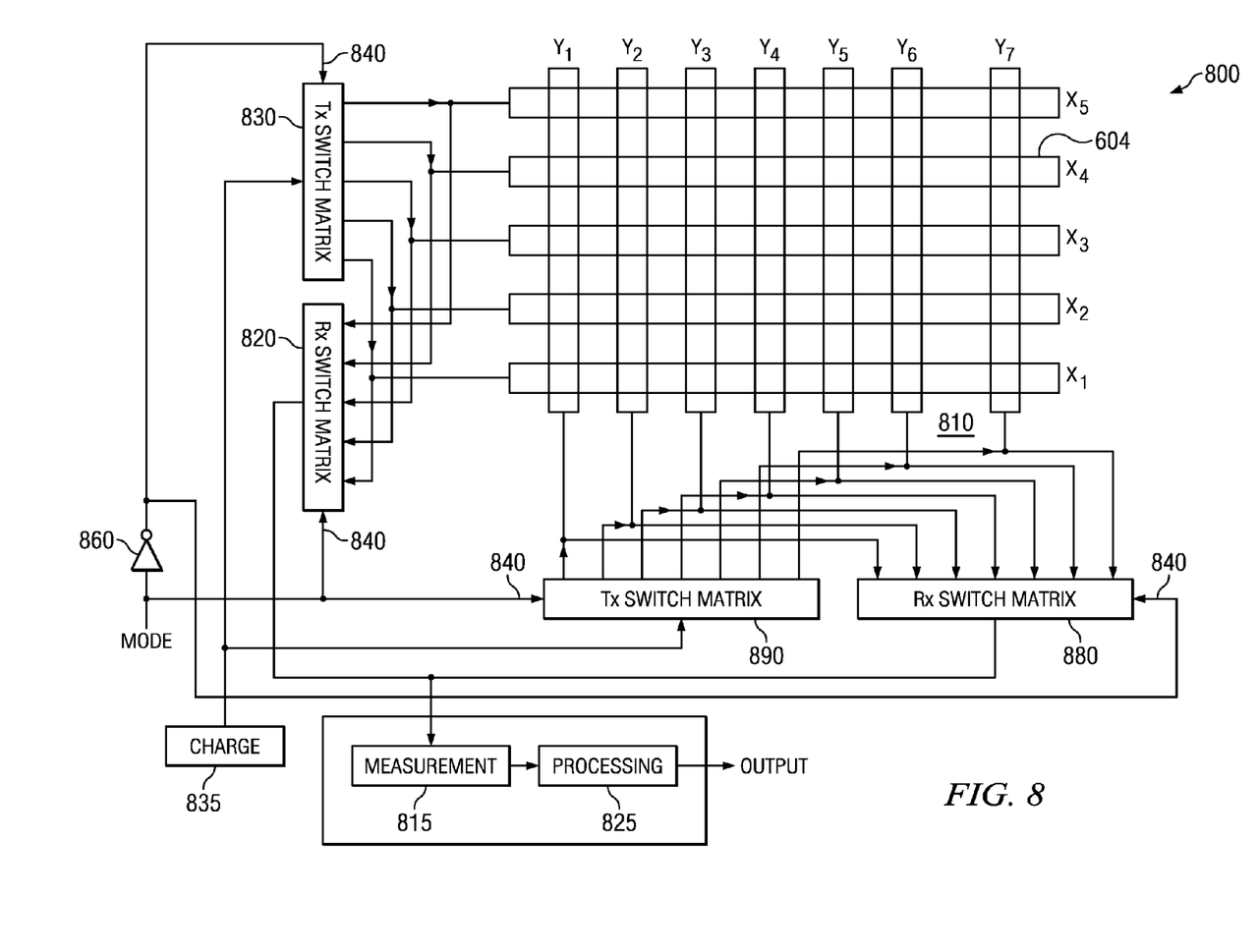
FIG. 8 is a block diagram of a capacitive touch screen system in which the X-axis lines and the Y-axis lines are selectively configurable as transmit or receive lines.

Reference is now made, in combination with FIGS. 6B and 6C, to FIG. 8 which illustrates a block diagram of a capacitive touch screen system 800. The touch screen system 800 includes a touch screen sensor 810, which comprises a plurality of X-axis lines Xn (parallel lines extending in an x-axis direction) and a plurality Y-axis lines Yn (parallel lines extending in a y-axis direction). Again, although the lines are illustrated as being orthogonally oriented, it will be understood that the first and second lines need only intersect.

The touch screen system 800 also includes a first switch matrix 820, comprising a receive (RX) switch matrix, having inputs coupled respectively to an end of each of the X-axis lines Xn. The touch screen system 800 further includes a second switch matrix 830, comprising a transmit (TX) switch matrix, having outputs coupled respectively to the same end of each of the X-axis lines Xn. The first switch matrix 820 and second switch matrix 830 each have an enable input 840 that receives a control signal for enabling/disabling switch matrix operation. The control signal is derived from a MODE signal such that the MODE signal is applied to the enable input 840 of the first switch matrix 820 and a complement of the MODE signal (i.e., MODE/) is applied to the enable input 840 of the second switch matrix 830. The complement of the MODE signal is produced by inverter 860. Thus, when the first switch matrix 820 is enabled for operation the second switch matrix 830 is disabled from operation (and vice versa). In this way, the X-axis lines Xn are selectively configurable to operate as either transmit lines or receive lines depending on the state of the MODE signal.

The touch screen system 800 also includes a third switch matrix 880, comprising a receive (RX) switch matrix, having inputs coupled respectively to an end of each of the Y-axis lines Yn. The touch screen system 800 further includes a fourth switch matrix 890, comprising a transmit (TX) switch matrix, having outputs coupled respectively to the same end of each of the Y-axis lines Yn. The third switch matrix 880 and fourth switch matrix 890 each have an enable input 840 that receives a control signal for enabling/disabling switch matrix operation. The control signal is derived from the MODE signal in that the MODE signal is applied to the enable input 840 of the fourth switch matrix 890 and a complement of the MODE signal (i.e., MODE/) is applied to the enable input 840 of the third switch matrix 880. The complement of the MODE signal is produced by inverter 860. Thus, when the third switch matrix 880 is enabled for operation the fourth switch matrix 890 is disabled from operation (and vice versa). In this way, the Y-axis lines Yn are selectively configurable to operate as either transmit lines or receive lines depending on the state of the MODE signal.

The connection of the MODE signal and complementary MODE signal to the enable inputs 840 of the first-fourth switching matrices as described above and shown in FIG. 8 produces two selectable modes of operation: a first mode where the X-axis lines Xn are receive lines and the Y-axis lines Yn are transmit lines, and a second mode where the X-axis lines Xn are transmit lines and the Y-axis lines Yn are receive lines. As discussed above in connection with FIGS. 6A-6C and FIGS. 7A-7C, the advantage of operation in both the first and second modes is that different cross-capacitance measurements can be made at each intersection location and those measurements can be combined together (for example, mathematically or logically) to provide for a more accurate touch detection by reducing or eliminating the noise that is typically experienced on the receive lines during cross-capacitance measurement and which can lead to the detection of "false" touches.

The outputs of the first switch matrix 820 and third switch matrix 880 are coupled to the input of a capacitive measurement circuit 815, such as the circuit shown in FIG. 2, and the output of the capacitive measurement circuit 815 is coupled to the input of a processing circuit 825. The inputs of the second switch matrix 830 and fourth switch matrix 890 are coupled to the output of a charge circuit 835.

The connection of the MODE and MODE/ signals to the enable inputs 840 of the switch matrices 820, 830, 880 and 890 in the manner shown by FIG. 8 provides for selectively configuring the X-axis lines and the Y-axis lines as transmit or receive lines. Thus, in one mode of operation, for example when MODE is logic high, the first switch matrix 820 and the fourth switch matrix 890 are enabled for operation (while the second switch matrix 830 and third switch matrix 880 are disabled from operation), and this configures the touch screen system 800 in a first mode of operation with the X-axis lines configured as receive lines and the Y-axis lines configured as transmit lines (see, also, FIG. 6B). In this first mode, the charge circuit 835 selectively charges the Y-axis lines through the fourth switch matrix 890 and the capacitive measurement circuit 815 selectively measures capacitance of the X-axis lines through the first switch matrix 820. Conversely, in another mode of operation, for example when MODE is logic low (and thus MODE/ is logic high), the second switch matrix 830 and third switch matrix 880 are enabled for operation (while the first switch matrix 820 and the fourth switch matrix 890 are disabled from operation), and this configures the touch screen system 800 in a second mode of operation with the X-axis lines configured as transmit lines and the Y-axis lines configured as receive lines (see, also, FIG. 6C). In this second mode, the charge circuit 835 selectively charges the X-axis lines through the second switch matrix 830 and the capacitive measurement circuit 815 selectively measures capacitance of the Y-axis lines through the third switch matrix 880.

The processing circuit 825 receives the capacitance (i.e., cross-capacitance) measurement information output from the capacitive measurement circuit 815 with respect to each location 604 where the X-axis and Y-axis lines intersect. This capacitance measurement information is obtained with respect to each mode of operation; that is, a cross-capacitance measurement at each location 604 for a) when the X-axis lines are configured as receive lines and the Y-axis lines are configured as transmit lines (FIG. 6B and the first mode) and b) when the X-axis lines are configured as transmit lines and the Y-axis lines are configured as receive lines (FIG. 6C and the second mode).

The measured cross-capacitance at a given intersection location is referred to as $C_n$, where n denotes the mode of sensor operation such as n=1 indicating the first mode where the X-axis lines are configured as receive lines and the Y-axis lines are configured as transmit lines (FIG. 6B) and n=2 indicating the second mode where the X-axis lines are configured as transmit lines and the Y-axis lines are configured as receive lines (FIG. 6C). The processing circuit 825 then evaluates each location 604 where the X-axis and Y-axis lines intersect to determine a total capacitance measurement for that location in accordance with the following exemplary algorithm:

If $(C1>EVR)$ and $(C2>EVR)$, wherein $EVR$ is equal to a noise threshold value, then $Ctotal=(C1+C2)/2$ (where $Ctotal$ is the cross-capacitance value for that location 604).

Otherwise:

If $C1<C2$, then $Ctotal=x*C1+(1-x)*C2$ (where $x$ is a weight less than 1)

Otherwise:

If $C2<=C1$, then $Ctotal=x*C2+(1-x)*C1$ (where $x$ is a weight less than 1).

In the exemplary implementation shown with FIGS. 6B and 6C, and the resulting three dimensional histograms of FIGS. 7A and 7B, a value of x=0.75 was used for the weight to produce the combined and noise reduced three dimensional histogram of FIG. 7C. The effect of the mathematical combination described above is to emphasize cross-capacitance measurements exceeding the threshold EVR and deemphasize cross-capacitance measurements below the threshold EVR.

It will be understood that the algorithm described above represents just an example of how the processing circuit 825 could process the capacitance information at each location 604 produced from each mode of operation and combine that information in a manner which reduces or eliminates noise affects. The algorithm presented above provides a mathematical combination of the cross-capacitance measurements in the two operating modes. It will be understood, however, that other combination techniques, both mathematical and logical, could be used.

Figure 9:
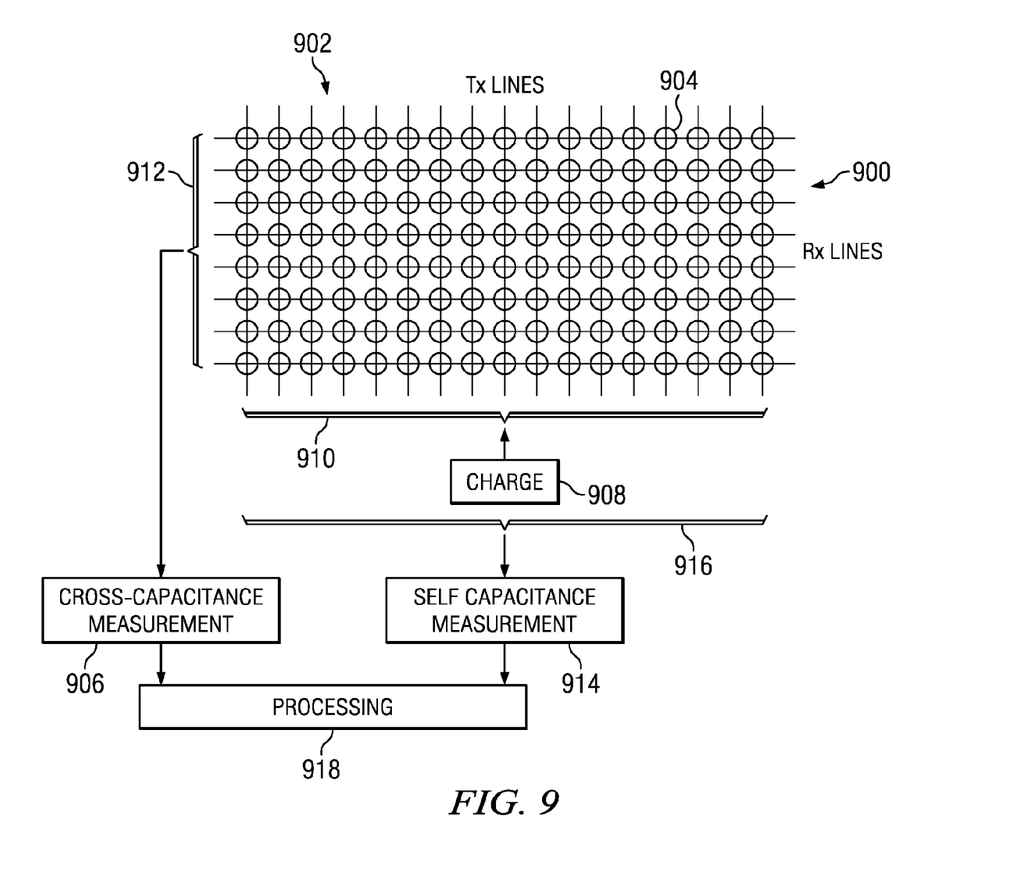
FIG. 9 is a schematic of a capacitive touch screen sensor in which the X-axis lines are receive lines and the Y-axis lines are selectively configurable as transmit lines or self capacitance measurement lines.

Reference is now made to FIG. 9 which illustrates a schematic of an alternative embodiment capacitive touch screen sensor. The sensor includes a plurality of X-axis lines Xn 900 (i.e., lines extending parallel to each other in the x-axis direction) and a plurality of Y-axis lines Yn 902 (i.e., lines extending parallel to each other in the y-axis direction). Again, the lines are illustrated as orthogonal as an example only. At each location 904 where the X-axis and Y-axis lines intersect, a cross-capacitance is defined. This cross-capacitance is measured in a first mode of operation by applying a charge to the transmit line and detecting the transfer of charge to the receive line. The charge is applied from a charge circuit 908 selectively coupled to each of the transmit lines through a first switching matrix 910. The detection is made by a cross-capacitance measurement circuit 906 selectively coupled to each of the receive lines through a second switching matrix 912. The transfer of charge is affected by a touch made to the sensor at or near the intersection location 904. By measuring transfer of charge at each location 904, and further processing that information for all locations of the sensor, a detection of the touch as well as the location of the touch can be made. This process is well known to those skilled in the art, but is subject noise issues (as discussed above) in connection with the receive lines.

To address the noise issues on the receive lines, the sensor of FIG. 9 further includes a self-capacitance measurement circuit 914. The self-capacitance measurement circuit 914 is selectively coupled to each of the transmit lines through a third switching matrix 916. This third switching matrix 916 is enabled for operation, so as to connect the transmit lines to the self-capacitance measurement circuit 914, in a second mode of sensor operation that is separate from the first mode described above where the first switching matrix 910 and second switching matrix 912 are enabled for operation in connection with making the cross-capacitance detection through the cross-capacitance measurement circuit 906. The self-capacitance measurement circuit 914 operates to make a self-capacitance measurement with respect to each of the transmit lines. The self-capacitance measurement circuit 914 may have a configuration similar to the circuit of FIG. 2 or may have any other configuration known to those skilled in the art.

A processing circuit 918 receives the cross-capacitance measurements from the cross-capacitance measurement circuit 906 with respect to each location 904 where the X-axis and Y-axis lines intersect. The processing circuit 918 further receives the self-capacitance measurements from the self-capacitance measurement circuit 914 with respect to each of the transmit lines. The processing circuit 918 then evaluates each location 904 where the X-axis and Y-axis lines intersect to determine a total capacitance measurement for that location in accordance with the following exemplary algorithm:

If ($Cc>EVR$) and ($C1>EVR$), wherein $EVR$ is equal to a noise threshold value (which could be different for the $Cc$ and $C1$ measurements, if desired), then $Ctotal=(Cc+C1)/2$ (where $Cc$ is the measured cross-capacitance, $C1$ is the measured transmit line self-capacitance; and $Ctotal$ is the cross-capacitance value for that location 904).

Otherwise:

If $Cc<C1$, then $Ctotal=x*Cc+(1-x)*C1$ (where $x$ is a weight less than 1)

Otherwise:

If $C1<=Cc$, then $Ctotal=x*C1+(1-x)*Cc$ (where $x$ is a weight less than 1).

The effect of the mathematical combination described above is to emphasize cross-capacitance and self capacitance measurements exceeding the threshold EVR and deemphasize cross-capacitance and self capacitance measurements below the threshold EVR.

It will be understood that the algorithm described above represents just an example of how the processing circuit 918 could process the capacitance information at each location 904 produced from each mode of operation and combine that information in a manner which reduces or eliminates noise affects. The algorithm presented above provides a mathematical combination of the cross-capacitance and self-capacitance measurements in the two operating modes. It will be understood, however, that other combination techniques, both mathematical and logical, could be used.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A circuit, comprising:
 a capacitive touch sensor including a plurality of first lines and a plurality of second lines, said first and second lines being oriented to cross each other at intersections; and
 switching circuitry coupled to the plurality of first lines and the plurality of second lines of the capacitive touch sensor, said switching circuitry operable in a first mode to configure the plurality of first lines as receive lines and the plurality of second lines as transmit lines for measuring capacitance at the intersections of the first lines and second lines, and said switching circuitry further operable in a second mode to configure the plurality of first lines as transmit lines and the plurality of second lines as receive lines for measuring capacitance at the intersections of the first lines and second lines.

2. The circuit of claim 1, further comprising:
 a charge circuit having an output coupled to the switching circuitry; and
 a capacitance measurement circuit having an input coupled to the switching circuitry.

3. The circuit of claim 2, wherein the switching circuitry, when operable in the first mode, is configured to selectively couple the plurality of first lines as receive lines to the input of the capacitance measurement circuit and selectively couple the plurality of second lines as transmit lines to the output of the charge circuit.

4. The circuit of claim 2, wherein the switching circuitry, when operable in the second mode, is configured to selectively couple the plurality of second lines as receive lines to the input of the capacitance measurement circuit and selectively couple the plurality of first lines as transmit lines to the output of the charge circuit.

5. The circuit of claim 1, wherein the switching circuitry comprises:
 a first switching circuit having plural inputs coupled respectively to the plurality of first lines and having an output; and
 a second switching circuit having an input and a plurality of outputs coupled respectively to the plurality of first lines;
 the circuit further comprising control circuitry configured to selectively enable the first switching circuit in said first mode to configure the plurality of first lines as receive lines and selectively enable the second switching circuit in said second mode to configure the plurality of first lines as transmit lines.

6. The circuit of claim 5, further comprising:
 a charge circuit having an output coupled to the input of the second switching circuit; and
 a capacitance measurement circuit having an input coupled to the output of the first switching circuit.

7. The circuit of claim 5, wherein the switching circuitry further comprises:
 a third switching circuit having plural inputs coupled respectively to the plurality of second lines and having an output; and
 a fourth switching circuit having an input and a plurality of outputs coupled respectively to the plurality of second lines;
 said control circuitry further configured to selectively enable the third switching circuit in said second mode to configure the plurality of second lines as receive lines and selectively enable the fourth switching circuit in said first mode to configure the plurality of second lines as transmit lines.

8. The circuit of claim 7, further comprising:
 a charge circuit having an output coupled to the input of the second switching circuit and the input of the fourth switching circuit; and
 a capacitance measurement circuit having an input coupled to the output of the first switching circuit and to the output of the third switching circuit.

9. The circuit of claim 8, further comprising: a processing circuit having an input coupled to receive capacitance measurement information from an output of the capacitance measurement circuit, said capacitance measurement information comprising capacitance measurements between each of the first and second lines taken in both the first mode and the second mode.

10. The circuit of claim 9, wherein said processing circuit is operable to algorithmically combine the capacitance measurements taken in both the first mode and the second mode to obtain a total capacitance measurement at the intersection between each of the first and second lines.

11. The circuit of claim 10, wherein the algorithmic combination performed by said processing circuit is a mathematical combination that emphasizes capacitance measurements exceeding a threshold and deemphasizes capacitance measurements below said threshold.

12. A circuit, comprising:
a capacitive touch sensor including a plurality of first lines and a plurality of second lines, said first and second lines being oriented to cross each other at intersections; and
switching circuitry coupled to the plurality of first lines and the plurality of second lines of the capacitive touch sensor, said switching circuitry operable in a first mode to configure the plurality of first lines as receive lines and the plurality of second lines as transmit lines for measuring capacitance at the intersections of the first lines and second lines, and said switching circuitry further operable in a second mode to configure the plurality of second lines for self-capacitance measurement.

13. The circuit of claim 12, further comprising:
a charge circuit having an output coupled to the switching circuitry;
a capacitance measurement circuit having an input coupled to the switching circuitry; and
a self-capacitance measurement circuit having an input coupled to the switching circuitry.

14. The circuit of claim 13, wherein the switching circuitry, when operable in the first mode, is configured to selectively couple the plurality of first lines as receive lines to the input of the capacitance measurement circuit and selectively couple the plurality of second lines as transmit lines to the output of the charge circuit.

15. The circuit of claim 13, wherein the switching circuitry, when operable in the second mode, is configured to selectively couple the plurality of second lines to the input of the self-capacitance measurement circuit.

16. The circuit of claim 12, wherein the switching circuitry comprises:
a first switching circuit having plural inputs coupled respectively to the plurality of first lines and having an output;
a second switching circuit having an input and a plurality of outputs coupled respectively to the plurality of second lines;
the circuit further comprising control circuitry configured to selectively enable the first switching circuit and second switching circuit in said first mode to configure the plurality of first lines as receive lines and configure the plurality of second lines as transmit lines.

17. The circuit of claim 16, further comprising:
a charge circuit having an output coupled to the input of the second switching circuit; and
a capacitance measurement circuit having an input coupled to the output of the first switching circuit.

18. The circuit of claim 16, wherein the switching circuitry further comprises:
a third switching circuit having plural inputs coupled respectively to the plurality of second lines and having an output; and
said control circuitry further configured to selectively enable the third switching circuit in said second mode.

19. The circuit of claim 18, further comprising:
a charge circuit having an output coupled to the input of the second switching circuit;
a capacitance measurement circuit having an input coupled to the output of the first switching circuit; and
a self-capacitance measurement circuit having an input coupled to the output of the third switching circuit.

20. The circuit of claim 19, further comprising: a processing circuit having an input coupled to receive capacitance measurement information from an output of the capacitance measurement circuit and self-capacitance measurement information from an output of the self-capacitance measurement circuit, said capacitance measurement information comprising capacitance capacitance measurements between each of the first and second lines taken in the first mode, said self-capacitance measurement information comprising self-capacitance measurements for the second lines taken in the second mode.

21. The circuit of claim 20, wherein said processing circuit is operable to algorithmically combine the capacitance and self-capacitance measurements taken in both the first mode and the second mode to obtain a total capacitance measurement between each of the first and second lines.

22. The circuit of claim 21, wherein the algorithmic combination performed by said processing circuit is a mathematical combination that emphasizes capacitance and self-capacitance measurements exceeding a threshold and deemphasizes capacitance measurements below said threshold.

23. A method, comprising:
configuring a capacitive touch sensor including a plurality of first lines and a plurality of second lines, said first and second lines being oriented to cross each other at intersections, in a first mode wherein the plurality of first lines are configured as receive lines and the plurality of second lines are configured as transmit lines for measuring capacitance at the intersections of the first lines and second lines; and
configuring said capacitive touch sensor in a second mode wherein the plurality of first lines are configured as transmit lines and the plurality of second lines are configured as receive lines for measuring capacitance at the intersections of the first lines and second lines.

24. The method of claim 23, further comprising algorithmically combining the capacitance measurements taken in both the first mode and the second mode to obtain a total capacitance measurement between each of the first and second lines.

25. The method of claim 24, wherein algorithmically combining comprises performing a mathematical combination that emphasizes capacitance measurements exceeding a threshold and deemphasizes capacitance measurements below said threshold.

26. The method of claim 23, wherein configuring in the first mode comprises selectively making capacitance measurements on the plurality of first lines and selectively charging the plurality of second lines; and wherein configuring in the second mode comprises selectively making capacitance measurements on the plurality of second lines and selectively charging the plurality of first lines.

27. A method, comprising:
configuring a capacitive touch sensor including a plurality of first lines and a plurality of second lines, said first and second lines being oriented to cross each other at intersections, in a first mode wherein the plurality of first lines are configured as receive lines and the plurality of second lines are configured as transmit lines for measuring capacitance at the intersections of the first lines and second lines; and configuring said capacitive touch sensor in a second mode wherein the plurality of second lines are configured for self-capacitance measurement.

28. The method of claim 27, further comprising algorithmically combining the capacitance and self-capacitance measurements taken in both the first mode and the second mode to obtain a total capacitance measurement between each of the first and second lines.

29. The method of claim 28, wherein algorithmically combining comprises performing a mathematical combination that emphasizes capacitance and self-capacitance measurements exceeding a threshold and deemphasizes capacitance measurements below said threshold.

30. The method of claim 27, wherein configuring in the first mode comprises selectively making capacitance measurements on the plurality of first lines and selectively charging the plurality of second lines; and wherein configuring in the second mode comprises selectively making self-capacitance measurements on the plurality of second lines.

* * * * *

UNITED STATES PATENT AND TRADEMARK OFFICE
CERTIFICATE OF CORRECTION

| | | |
|---|---|---|
| PATENT NO. | : 8,654,098 B2 | Page 1 of 1 |
| APPLICATION NO. | : 13/229783 | |
| DATED | : February 18, 2014 | |
| INVENTOR(S) | : Kusuma Adi Ningrat | |

It is certified that error appears in the above-identified patent and that said Letters Patent is hereby corrected as shown below:

In the Claims:

At column 12, claim number 20, line number 15, please replace the phrase [capacitance capacitance measurements] with -- capacitance measurements --.

Signed and Sealed this
First Day of July, 2014

Michelle K. Lee
*Deputy Director of the United States Patent and Trademark Office*